United States Patent
Hom et al.

(10) Patent No.: US 10,513,450 B2
(45) Date of Patent: Dec. 24, 2019

(54) WASTEWATER FILTRATION SYSTEM

(71) Applicant: COLGATE-PALMOLIVE COMPANY, New York, NY (US)

(72) Inventors: Frank Hom, Wayne, NJ (US); Michael Paul Robinson, II, Brooklyn, NY (US)

(73) Assignee: Colgate-Palmolive Company, New York, NY (US)

( * ) Notice: Subject to any disclaimer, the term of this patent is extended or adjusted under 35 U.S.C. 154(b) by 142 days.

(21) Appl. No.: 15/190,983

(22) Filed: Jun. 23, 2016

(65) Prior Publication Data
US 2017/0369342 A1 Dec. 28, 2017

(51) Int. Cl.
*C02F 1/52* (2006.01)
*A46B 17/06* (2006.01)
*A47L 13/255* (2006.01)
*C02F 1/68* (2006.01)
*A47L 13/59* (2006.01)
*A47L 13/58* (2006.01)
*B01D 21/00* (2006.01)
*B01D 21/01* (2006.01)
(Continued)

(52) U.S. Cl.
CPC ............. *C02F 1/52* (2013.01); *A46B 17/06* (2013.01); *A47L 13/255* (2013.01); *A47L 13/50* (2013.01); *A47L 13/58* (2013.01); *A47L 13/59* (2013.01); *B01D 21/0012* (2013.01); *B01D 21/01* (2013.01); *B01D 35/26* (2013.01); *B01D 36/04* (2013.01); *C02F 1/5281* (2013.01); *C02F 1/688* (2013.01); *B01D 2201/184* (2013.01); *B01D 2201/30* (2013.01); *B08B 3/14* (2013.01); *C02F 1/002* (2013.01); *C02F 2103/002* (2013.01); *C02F 2307/12* (2013.01)

(58) Field of Classification Search
None
See application file for complete search history.

(56) References Cited

U.S. PATENT DOCUMENTS 1,152,846 A 9/1915 Ross
3,559,381 A 10/1968 Fesco
(Continued)

FOREIGN PATENT DOCUMENTS

CA 2638922 A1 3/2009
CN 202173844 U 3/2012
(Continued)

OTHER PUBLICATIONS

International Search Report and the Written Opinion of the International Searching Authority issued in PCT/US2017/039016 dated Oct. 23, 2017.

*Primary Examiner* — Benjamin M Kurtz

(57) ABSTRACT

A flocculation system is provided including a vessel having an open top. The flocculation system also includes a sidewall comprised of a water-impermeable material. The flocculation system further includes a first bottom comprising the water-impermeable material. The flocculation system further includes a second bottom having a floc filter that passes flocs and prevents the passage of a cleaning tool. The flocculation system further includes a floc trap below the second bottom. The floc trap includes a space defined by the sidewall, the first bottom, and the floc filter. In some implementations, the flocculation system includes a flocculant disposed on the sidewall, the floc filter, or the first bottom.

12 Claims, 17 Drawing Sheets

(51) Int. Cl.
    *B01D 35/26*    (2006.01)
    *B01D 36/04*    (2006.01)
    *A47L 13/50*    (2006.01)
    *C02F 1/00*     (2006.01)
    *C02F 103/00*   (2006.01)
    *B08B 3/14*     (2006.01)

(56) References Cited

U.S. PATENT DOCUMENTS

| | | | |
|---|---|---|---|
| 3,839,202 A * | 10/1974 | Roy | C02F 1/5227 |
| | | | 210/732 |
| 4,179,368 A | 12/1979 | Willis | |
| 5,637,229 A | 6/1997 | Rieber | |
| 6,379,409 B1 | 4/2002 | Dijkman | |
| 6,554,997 B1 | 4/2003 | Schilling et al. | |
| 7,025,880 B2 * | 4/2006 | Lamb | B01D 29/03 |
| | | | 15/264 |
| 7,300,579 B2 | 11/2007 | Yonekawa et al. | |
| 7,611,555 B2 | 11/2009 | Wattenberg et al. | |
| 7,837,869 B2 | 11/2010 | Peters, Jr. et al. | |
| 7,967,988 B1 | 6/2011 | Miller | |
| 8,097,054 B2 | 1/2012 | Schultink et al. | |
| 8,845,906 B2 | 9/2014 | Henley | |
| 9,926,105 B2 * | 3/2018 | Tsui | B65D 21/086 |
| 2004/0065613 A1 | 4/2004 | Cadera et al. | |
| 2008/0289663 A1 * | 11/2008 | Young | B08B 3/08 |
| | | | 134/40 |
| 2014/0190879 A1 | 7/2014 | Young | |
| 2014/0263058 A1 | 9/2014 | Fagher | |

FOREIGN PATENT DOCUMENTS

| | | | |
|---|---|---|---|
| WO | WO 2008116724 A1 | 10/2008 | |
| WO | WO 2015143785 A1 | 10/2015 | |

\* cited by examiner

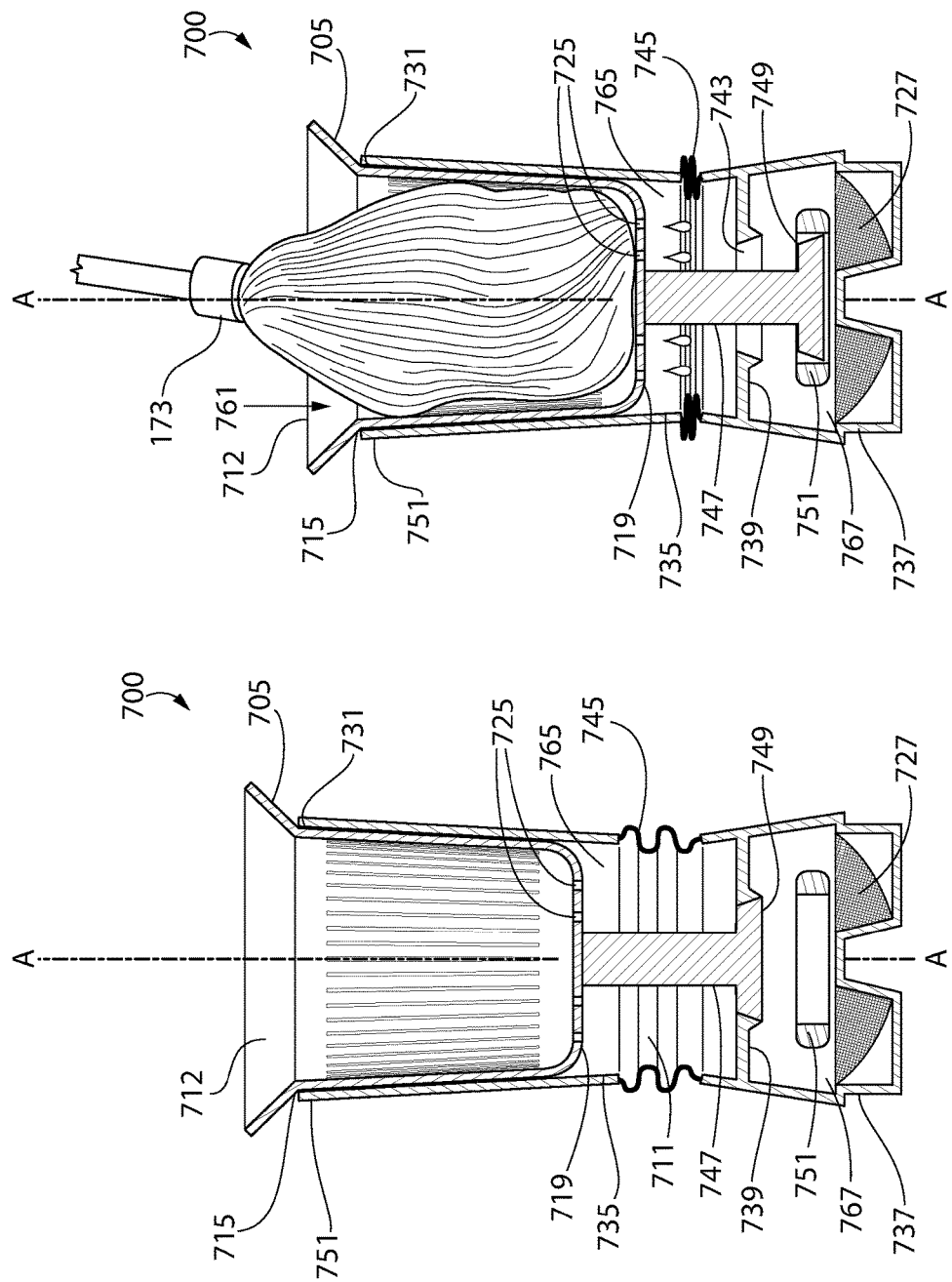

WASTEWATER FILTRATION SYSTEM

CROSS-REFERENCE TO RELATED APPLICATIONS

This application is related to application Ser. No. 15/191,012 filed Jun. 23, 2016 titled, "Wastewater Filter", the disclosure of which is incorporated herein by reference in its entirety.

BACKGROUND

Filtration of wastewater involves causing small, suspended particles to cluster together and settle. This process includes two steps, namely "coagulation" and "flocculation." "Coagulation" refers to driving together of colloidal particles by chemical forces. "Flocculation" refers to assembling the coagulated particles into clumped masses, called "flocs," which settle out of the wastewater. Flocculation may use a chemical-bridging mechanism, enhanced by the use of substances like polyelectrolytes.

Wastewater filtration systems are widely used in public sanitation and industrial enterprises. However, residential use of such systems is generally limited to applications such as clarifying water in ponds, swimming pools, and the like.

BRIEF SUMMARY

Implementations consistent with the present disclosure provide a flocculation system including a vessel having an open top. The flocculation system includes a sidewall comprising a water-impermeable material. The flocculation system further includes a first bottom comprising the water-impermeable material. The flocculation system further includes a second bottom comprising a floc filter that passes flocs and prevents the passage of a cleaning tool. The flocculation system further includes a floc trap below the second bottom, the floc trap comprising a space defined by the sidewall, the first bottom, and the floc filter. In some implementations, the flocculation system includes a flocculant disposed on the sidewall, the floc filter, or the first bottom. In some implementations the flocculant is a solid or a gel. In some implementations, the floc filter comprises a replaceable dispenser storing the flocculant. In some implementations, the floc filter comprises a mesh screen. In some implementations, the mesh screen comprises a plurality of holes, and wherein the holes range in size from about 0.25 inch to about 1.0 inch across. In some implementations, the vessel collapses to a flat form. In some implementations, the sidewall accordions to the flat form using a plurality of folding edges in the sidewall. In some implementations, the first bottom and the second bottom collapse to the flat form using at least one horizontal folding edge in the sidewall. In some implementations, the flocculation system is self-standing when filed with a liquid. In some implementations, the flocculation system further includes a bucket mount comprising a strut fastens on a mouth of a bucket and support arms affixed to a top of the strut. The vessel can mount onto the support arms. In some implementations, the vessel includes a mop wringer. In some implementations, the flocculation system comprises a disposable bucket insert.

Additionally, implementations consistent with the present disclosure provide a flocculation system including a base, which can have a substantially cylindrical form. The base can include an open, first top, a first sidewall, a closed, first bottom comprising a floc filter that blocks flocs and pass water, and a flocculant dispenser. The flocculation system further includes a wringer that mounts on the base and which can also have a substantially cylindrical or conical form. The wringer includes an open second top, and second sidewall and/or a second bottom comprising a plurality of holes. In some further implementations, the base further comprises a pump device force the water from the wringer through the floc filter. In some implementations, the pump device comprises a spring that vertically compress under a vertical manual force applied to the wringer unit and a one-way valve or diaphragm that prevents backflow of the water and the flocs from the floc filter. In some implementations, the spring comprises an elastic bladder or a bellows spring. In some implementations, the pump device comprises a press filter comprising a linear connector having a first end connected to the wringer and a second end connected to a filter plate. The filter plate can define an upper interior space of the base between an upper surface of the filter plate, the first sidewall of the base, and the open first top of the base. The filter plate can define a lower interior space between a bottom surface of the filter plate, the sidewall of the base, and the bottom of the base. In some implementations, the filter plate is passes the flocs from an upper interior space to lower interior space, blocks the flocs from passing from the lower interior space to the upper interior space, translates vertically through the lower interior space under a vertical manual force applied to the wringer, and elastically rebounds to an original position after the manual force applied to the wringer is removed. In some implementations, the press filter further comprises a spring that compresses under a vertical force applied to the wringer. In some implementations, the base further comprises a second bottom including a thru-hole. In some implementations, the pump device comprises a plug plugging the thru-hole of the base, a rigid linear conduit having a first end connected to the wringer and a second end connected to the plug; and a spring providing vertical upward force on the wringer. In some implementations, the wringer passes the flocs into to base and drives water from the base via the floc filter by translating vertically under a vertical force applied to the wringer.

Further areas of applicability of the present invention will become apparent from the detailed description provided hereinafter. It should be understood that the detailed description and specific examples, while indicating some preferred aspects of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7B illustrates a cutaway side view of an exemplary flocculation system in accordance with aspects of the present disclosure; and FIG. 7C illustrates a cutaway side view of an exemplary flocculation system in accordance with aspects of the present disclosure.

DETAILED DESCRIPTION

The following description of various preferred aspect(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

The present disclosure is generally directed to flocculation and, more specifically, to hand-portable flocculation systems, manually operated flocculation systems, and residential-use flocculation systems. Systems and methods consistent with those disclosed herein clarify water in a hand-portable vessel by causing particles (e.g., dirt, dust, sediment, food particles, lint, etc.) to form flocs and then trap the flocs and debris using a floc filter. For example, the exemplary flocculation systems disclosed herein can be used to clarify water in a mop bucket. By trapping the flocs, the flocculation systems disclosed herein conserve resources by extending the useable life of water and cleaning products (e.g., soap or detergent) contained therein. Additionally, the exemplary flocculation systems prevent, reduce, or ameliorate the fouling of cleaning tools (e.g., mops, sponges, rags, brushes, and the like) by dirt, debris, flocs, and the like in the water.

In some implementations, a flocculation system in accordance with aspects of the present disclosure provides a self-supporting bucket that can be collapsed into a flat form and expanded for use. Additionally or alternatively, the flocculation system can be a disposable insert that can be supported within a bucket or other such vessels (e.g., a tank, a sink, and the like). In some other implementations, the flocculation system is a submersible unit that can be placed in a bucket or other such vessels. In implementations, the flocculation system can also include a pump that forces wastewater through the floc filter.

Figure 1A:
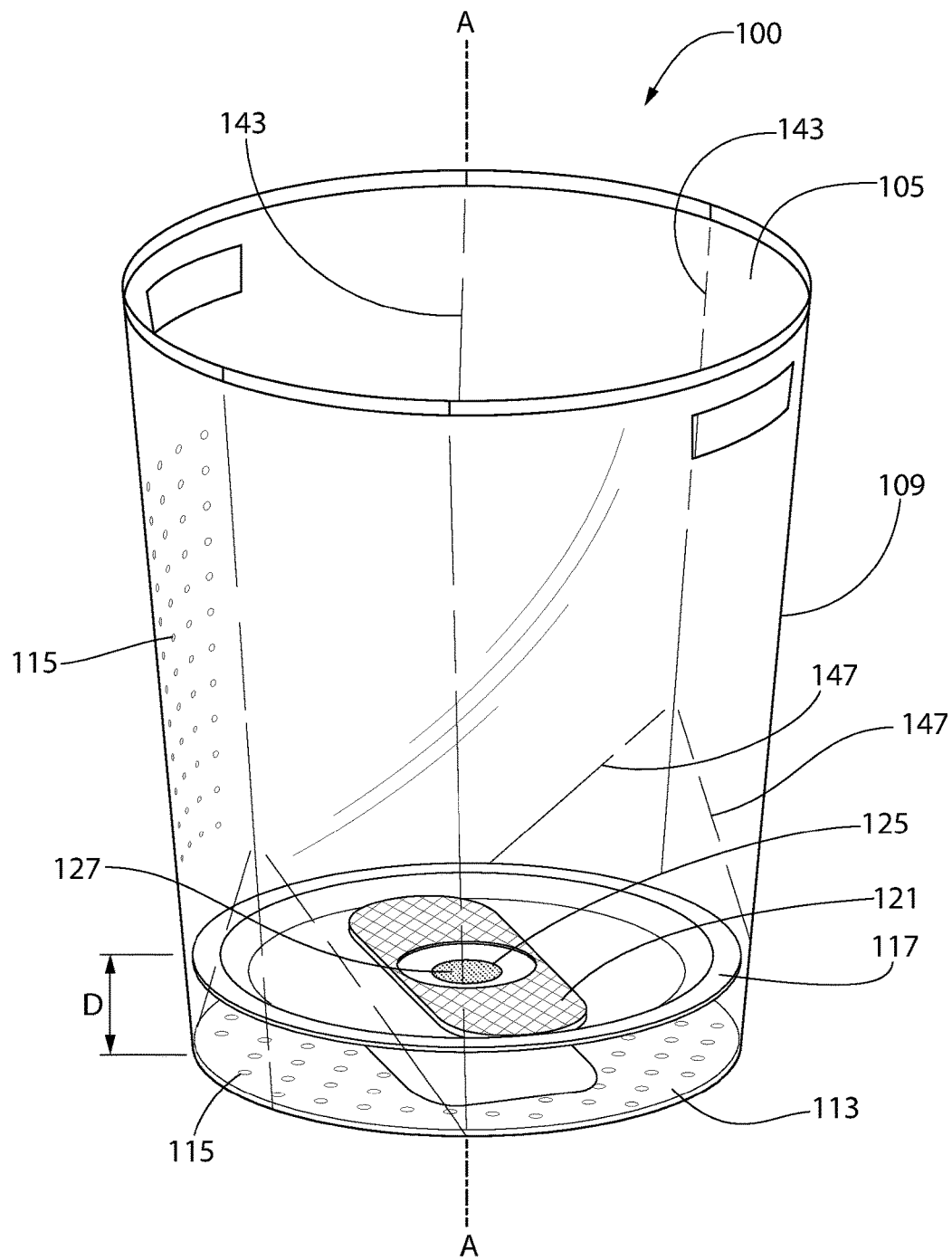
FIG. 1A illustrates a side perspective view of an exemplary flocculation system in accordance with aspects of the present disclosure.

FIG. 1A illustrates a side perspective view of an exemplary flocculation system 100 in accordance with aspects of the present disclosure. In implementations, the flocculation system 100 is a substantially cylindrical vessel, (which includes e.g., a cuboidal vessel an elliptical-rimmed vessel, or a rectangular-rimmed vessel), having an open top 105, a sidewall 109, a first bottom 113, and a second bottom 117. The first bottom 113 closes the sidewall 109 such that they form a water-tight, hand-portable vessel (e.g., a bucket). The sidewall 109 and the first bottom 113 can be constructed of water-impermeable materials, such as metal, rubber, silicon, plastic, vinyl, TYVEK, or the like. In some implementations, the material forming the sidewall 109 and the first bottom 113 is stiff such that the flocculation system 100 holds the shape of a bucket and is free-standing when filled with water. Additionally, in some implementations, the sidewall 109 and the first bottom 113 can be coated and/or impregnated with a flocculant 115 (e.g., AJAX CLEAN WATER from the Colgate-Palmolive company of New York, N.Y.) that releases when exposed to or submerged in water.

The second bottom 117 is offset a distance D above the first bottom 113 along the central vertical axis A of the flocculation system 100, and closes or abuts the sidewall 109. The distance D can be range from, for example, about one inch to about six inches. The second bottom 117 includes a floc filter 121 that partially or entirely comprises the second bottom 117. The floc filter 121 includes a large number of thru-holes sized to allow flocs to pass, while preventing a mop or other cleaning tool from passing below second bottom 117. For example, the floc filter 121 can be a mesh screen having openings or holes. In various implementations the holes may range in size from about one-quarter (0.25) inch to about one (1.0) inch across (e.g., per side for square holes, or in diameter for round holes). A space defined by the sidewall 109, the first bottom 113, and the second bottom 117 comprises a floc trap that collects and holds flocs and other debris, for example, wrung or dislodged from a dirty mop or the like. Additionally, in implementations the flocculation system 100 includes a flocculant dispenser 125 at the first bottom 113 or the second bottom 117. The flocculant dispenser 125 can be a disk or cartridge that stores a flocculant 127 (e.g., a liquid, a powder, a gel, or a solid) that disperses when submerged in water.

Figure 1B:
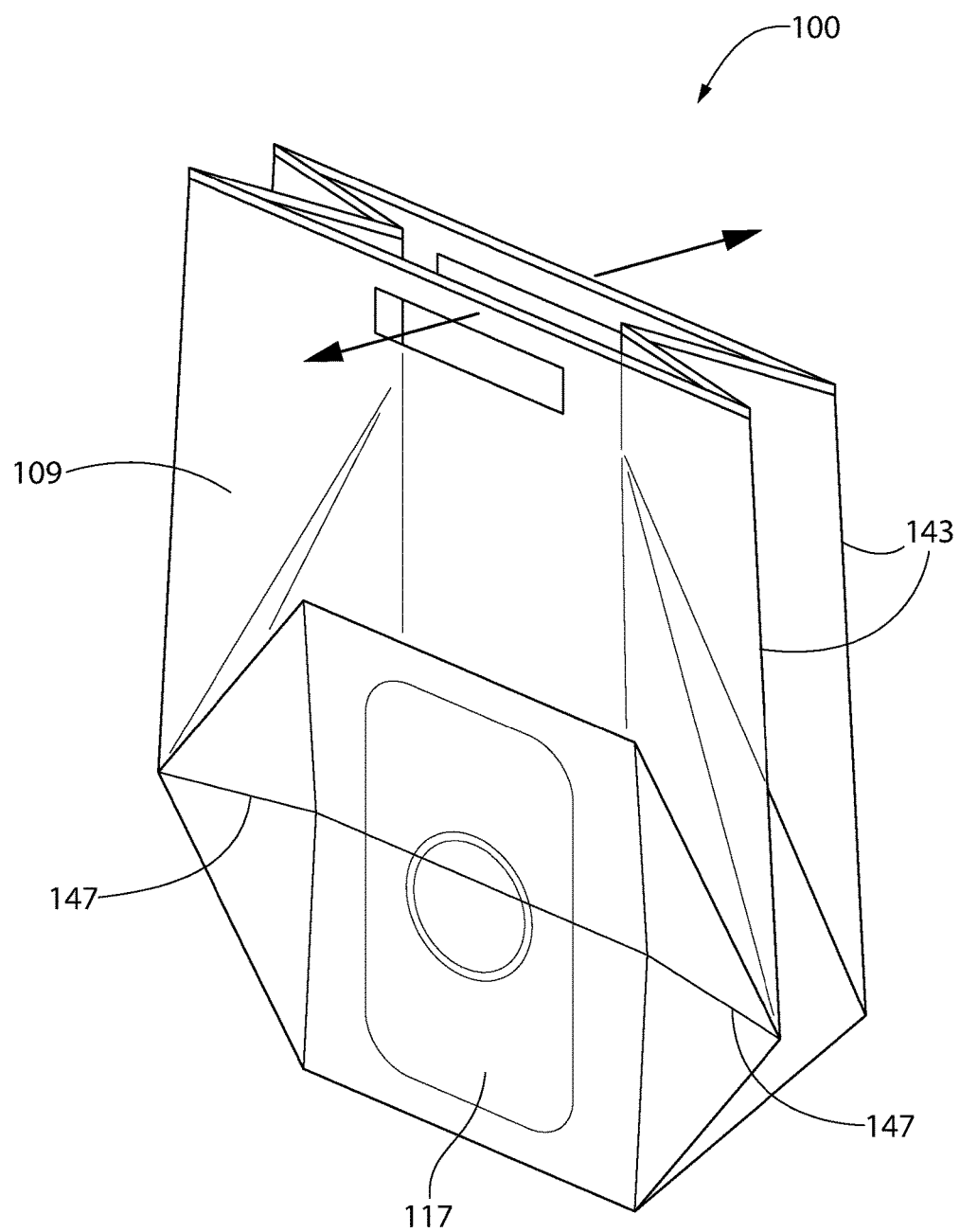
FIG. 1B illustrates a side perspective view of an exemplary flocculation system in the flattened form in accordance with aspects of the present disclosure.
Figure 1C:
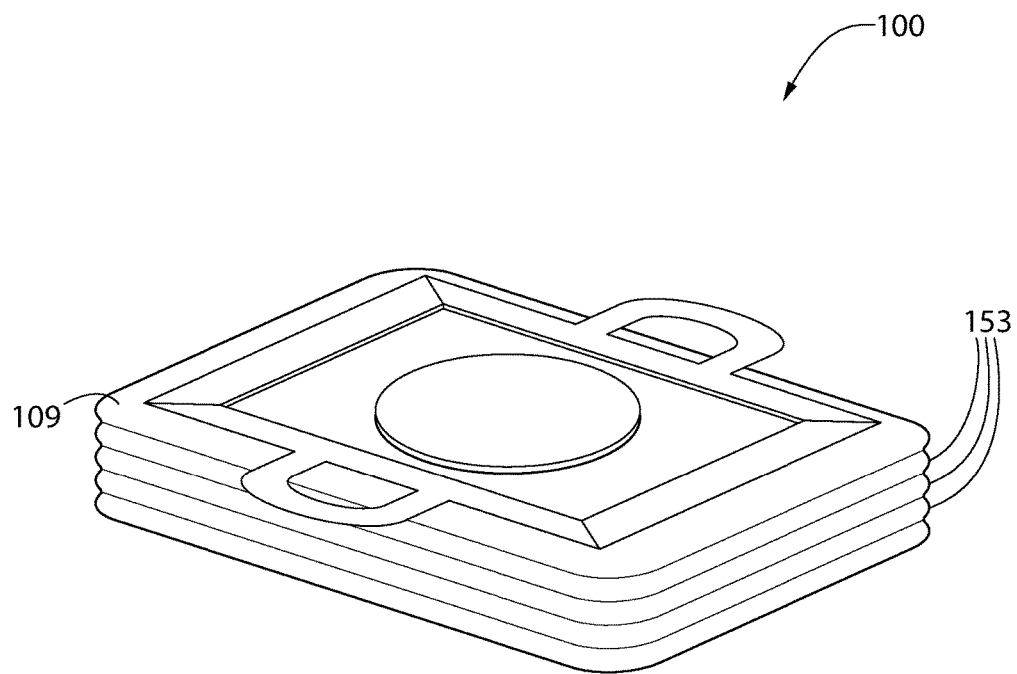
FIG. 1C illustrates a side perspective view of an exemplary flocculation system in a flattened form in accordance with aspects of the present disclosure.

Still referring to FIG. 1A, implementations of the flocculation system 100 can be collapsible into a flat form for, e.g., display, transport, and/or storage. In some configurations, the sidewall 109 of the flocculation system 100 includes one or more vertical fold lines 143 along which the sidewall 109 can collapse accordion-style. The sidewall 109 can also include one or more horizontal and/or diagonal fold lines 147 along which the second bottom 117 can fold flat against the sidewall 109. FIG. 1B illustrates a perspective view of the flocculation system 100 arranged in an exemplary flattened form by collapsing the sidewall 109 along the vertical fold lines 143, and by collapsing the first bottom 113 and the second bottom 117 along the horizontal fold lines 147. FIG. 1C illustrates a perspective view of the flocculation system 100 arranged in another exemplary flattened form, in which the sidewall 109 is collapsed accordion-style along two or more horizontal fold lines 153.

Figure 1D:
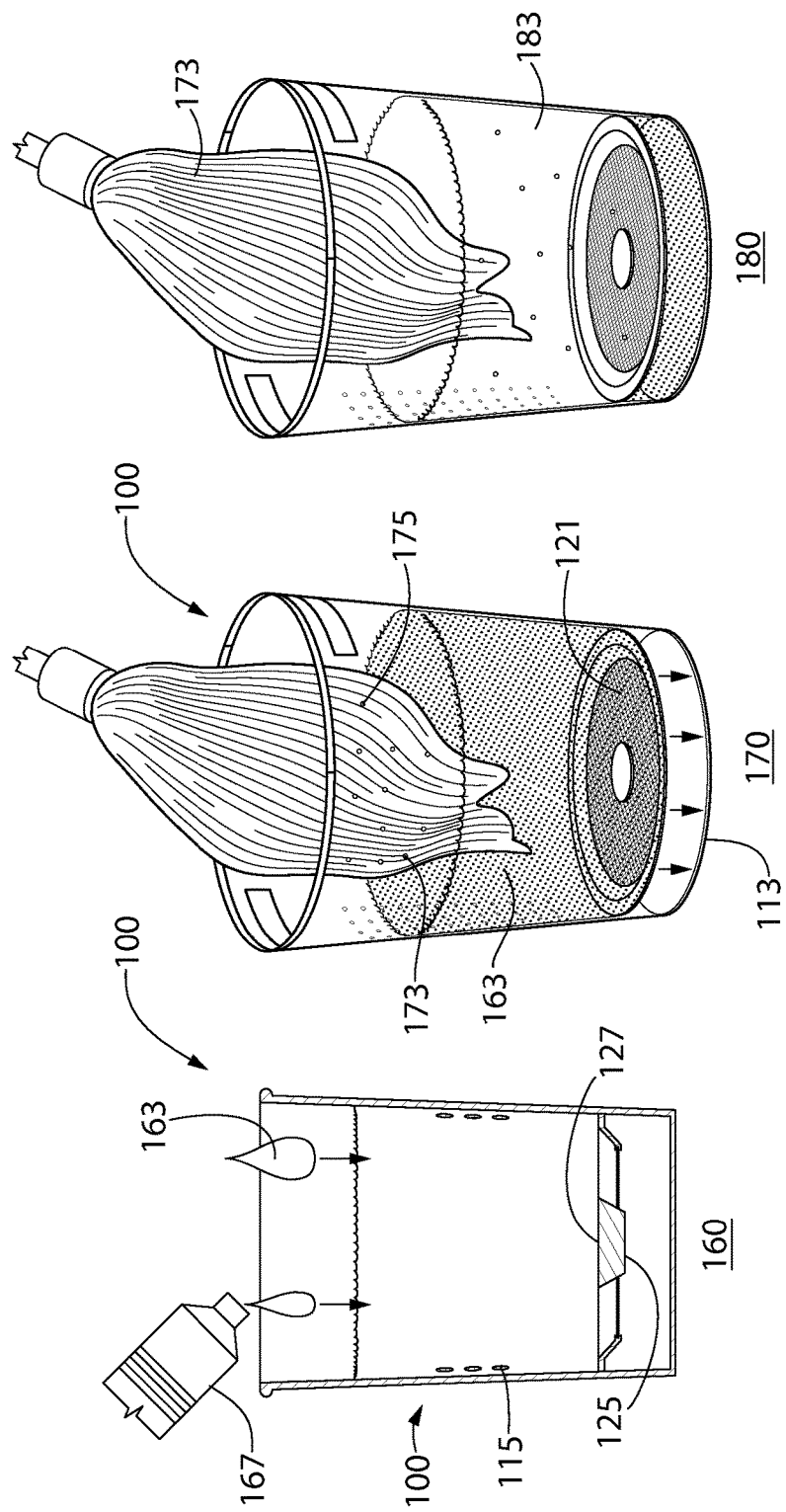
FIG. 1D illustrates an exemplary process for using a flocculation system in accordance with aspects of the present disclosure.

FIG. 1D illustrates an exemplary process for using the flocculation system 100. As described previously herein, a user may obtain the flocculation system 100 in a flat form. After expanding the flocculation system 100 into a bucket form, at 160 the user can fill the flocculation system 100 with water 163 and add a cleaning product 167. A flocculation product can also be released in the water, either separately or a flocculation composition may be part of the cleaning product 167. As described above, in some cases the flocculation system 100 may include flocculant 115 in or on the sidewall 109 and/or flocculant 127 in the flocculant dispenser 125. In other cases, the flocculation system 100 may not include any flocculant and, instead, the user may place a separately provided flocculant into the water (e.g., AJAX CLEAN WATER). At 170, the user can place a mop 173 or other cleaning tool into the flocculation system 100 to rinse away dirt and debris and the like. The flocculant 115 and/or 127 in the water 163 causes flocs 175 to form from the dirt and debris. The flocs 175 are heavier than the water 163 and they settle to the first bottom 113 after passing through the floc filter 121. The flocs 175 and other debris may become trapped under the floc filter 121, and the mop 173 cannot pass through the floc filter 121. Thus, as illustrated at 180, the flocs 175 and other debris are kept separated from the mop 173 by the floc filter 121, and clarified water 183 is created and maintained for the mop 173 above the floc filter 121.

Figure 2:
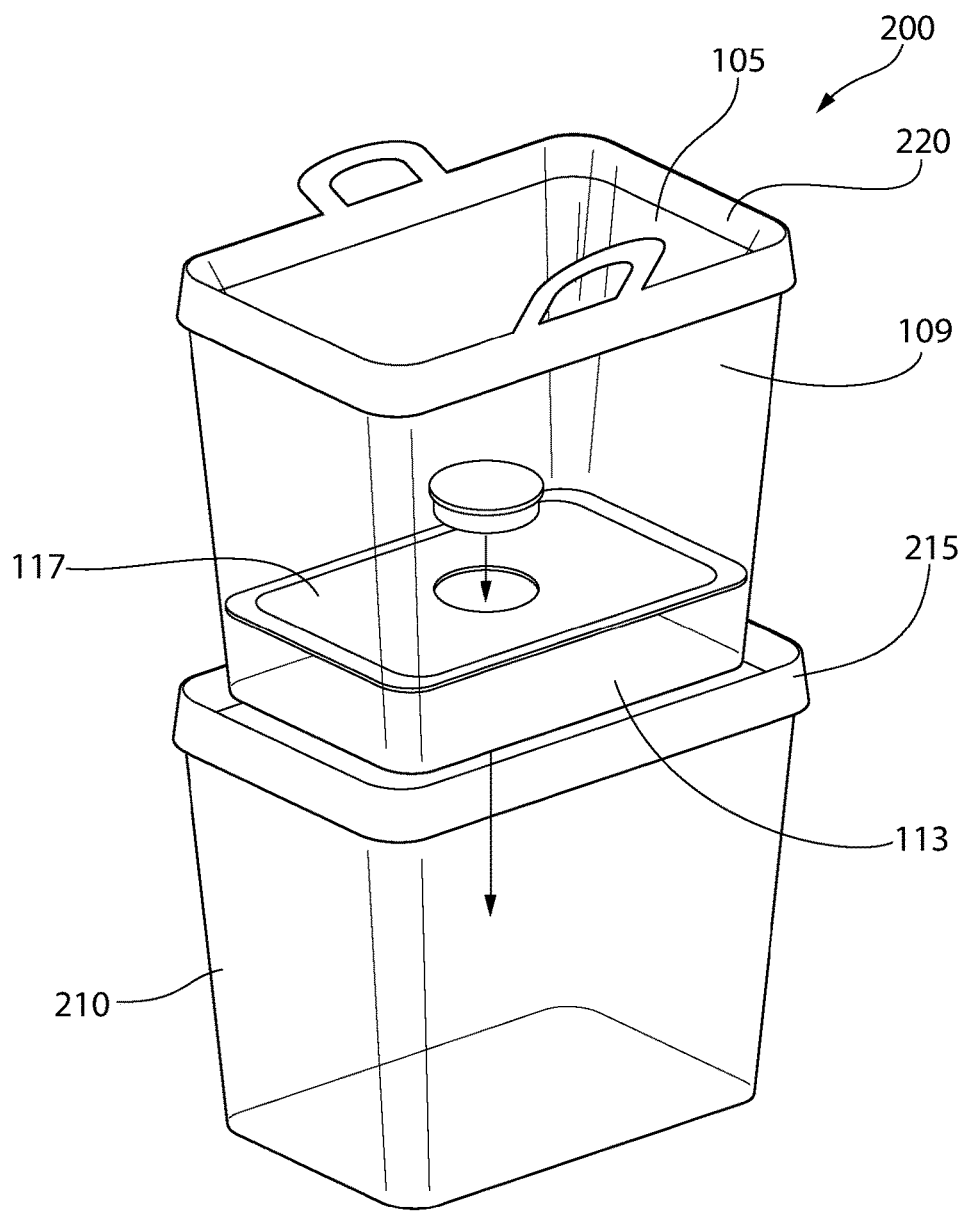
FIG. 2 illustrates an exploded, side perspective view of an exemplary flocculation system in accordance with aspects of the present disclosure.

FIG. 2 illustrates an exploded, side perspective view of an exemplary flocculation system 200 in accordance with aspects of the present disclosure. In the implementation shown, the flocculation system 200 is a substantially cylindrical vessel (e.g., which includes a cuboidal or rectangular-rimmed vessel) having an open top 105, a sidewall 109, a first bottom 113, and a second bottom 117, which can be the same or similar to those previously described herein. As shown, the flocculation system 200 can be a disposable insert for a separate bucket 210. In implementations, the flocculation system 200 can be mounted in the bucket 210 by folding a portion 220 of the sidewall 109 at the open top 105 over a mouth 215 of the bucket 210, such that the second bottom 117 is suspended in the interior volume of the bucket 210. In embodiments, the portion 220 of the sidewall 109 at the open top 105 of the flocculation system 200 is reinforced. For example, the portion 220 may include one or more flexible additional layers of the material comprising the sidewall 109. Additionally or alternatively, the portion 220 can include a reinforcing material that is different than the material of the sidewall 109 (e.g., a rigid or semi-rigid plastic) and that is shaped to fit over the mouth 215. After being mounted in the bucket 210, the flocculation system 200 can be used and disposed of in the same or similar manner to that previously described herein.

Figure 3A:
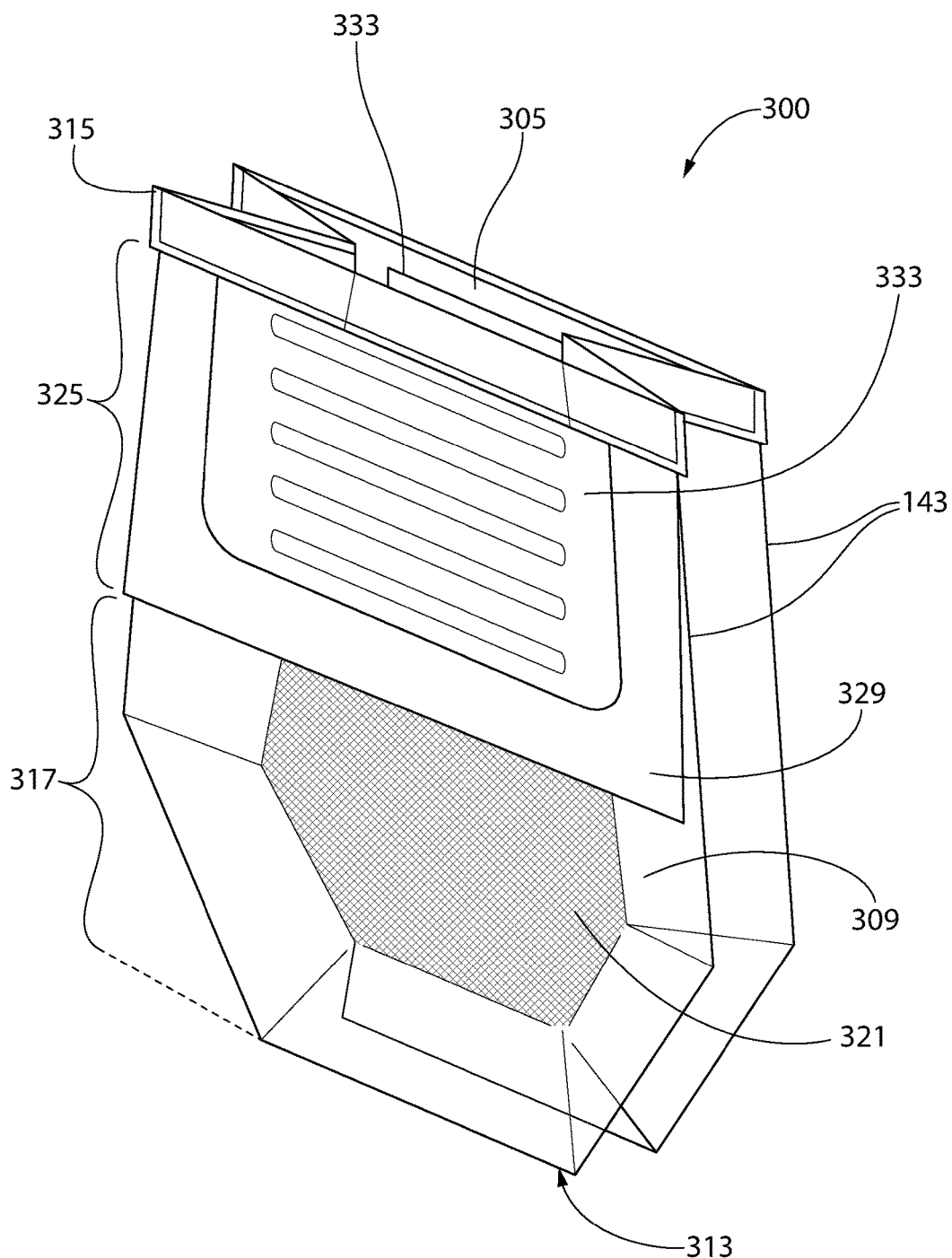
FIG. 3A illustrates a side perspective view of an exemplary flocculation system in accordance with aspects of the present disclosure.

FIG. 3A illustrates a side perspective view of an exemplary flocculation system 300 in accordance with aspects of the present disclosure. In FIG. 3A, the flocculation system 300 is shown in a folded configuration. In implementations, the flocculation system 300 is a vessel having an open top 305, a sidewall 309, and a bottom 313. The bottom 313 closes the sidewall 309 such that a bucket-shape or a pouch-shape is formed. Similar to the implementations previously described herein, the sidewall 309 and/or the bottom 313 can be coated or impregnated with a flocculant product (e.g., flocculant 115) that causes dirt and the like in water passing over and through the sidewall 309 and/or bottom 313 to form into flocs.

In implementations, an edge of the sidewall 309 at the open top 305 of the flocculation system 300 includes a lip 315 for mounting the flocculation system 300 to a bucket (e.g., bucket 210), as described in greater detail below. In some implementations, the lip 315 can include one or more additional layers of the flexible material comprising the sidewall 309. Additionally or alternatively, the lip can include one or more pieces of a reinforcing material that is different than the material of the sidewall 309 (e.g., a rigid or semi-rigid plastic).

A bottom portion 317 of the flocculation system 300 includes a floc filter 321 having a large number of thru-holes sized to prevent the passage of flocs and other debris, but to easily allow the passage of water. For example, the floc filter 321 can be a mesh screen or perforated sheet with holes that are less than about one-quarter inch across (e.g., per side for square holes, or in diameter for round holes). In implementations, the holes are less than about one-eight inch across. A top portion 325 of the flocculation system 300 includes a wringer 329 for wringing-out a mop or other cleaning tools into the floc filter 321. In implementations, the wringer 329 includes a pair of rigid or semi-rigid plates 333 that directly face one another on opposite sides of the sidewall 309. The plates 333 can be arranged to lie flat on top of one another such that the flocculation system 300 can be collapsed into a flat form along vertical fold lines 143, as previously described herein.

Figure 3B:
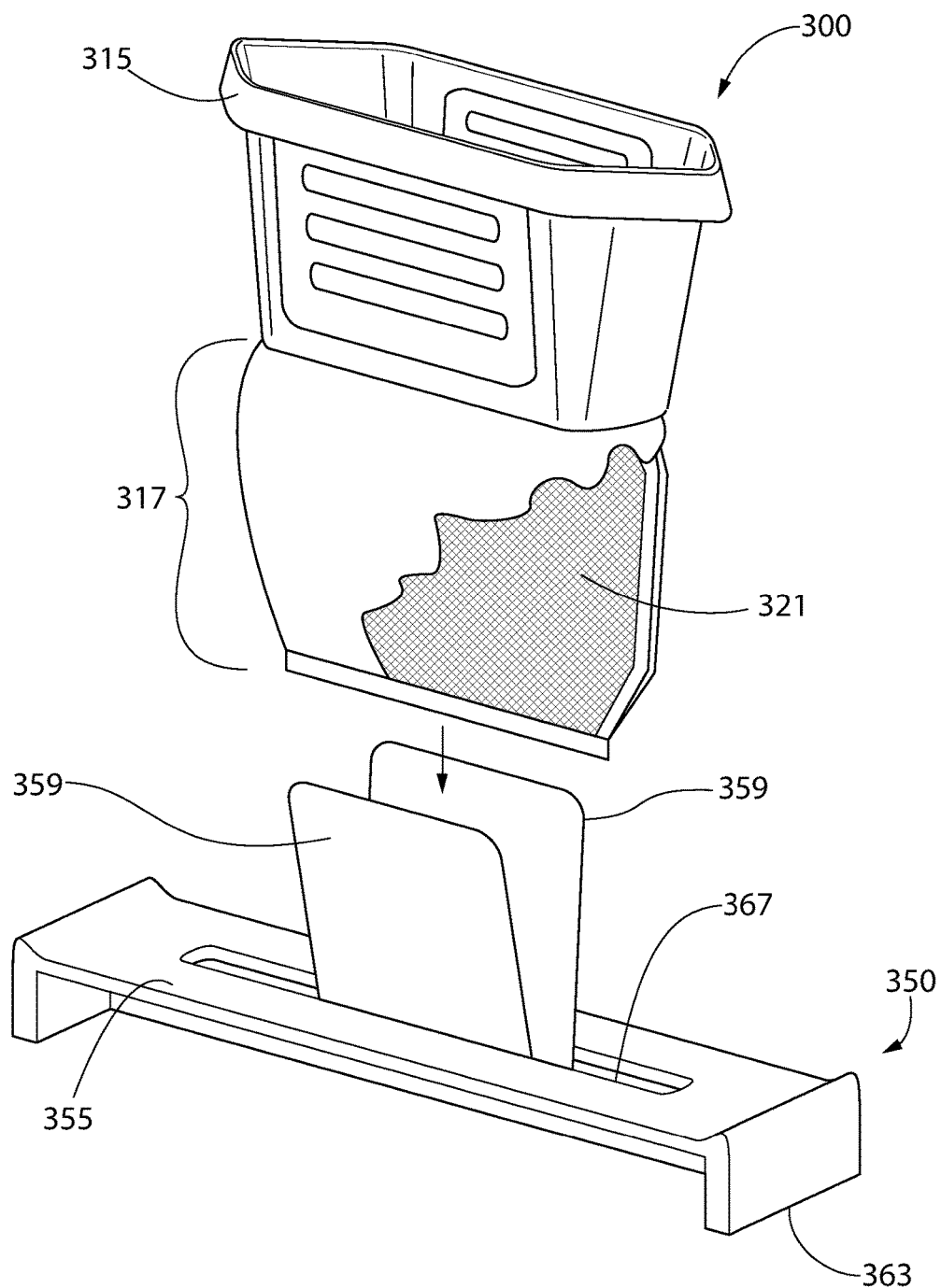
FIG. 3B illustrates an exploded, side perspective view of an exemplary flocculation system in accordance with aspects of the present disclosure.

FIG. 3B illustrates an exploded, side perspective view of the exemplary flocculation system 300 in association with an exemplary bucket mount 350 for supporting the flocculation system 300. Implementations of the bucket mount 350 include a strut 355 and support arms 359. The strut 355 is a substantially horizontal, rigid beam including flanges 363 and a thru-slot 367. The flanges 363 can be formed to fit onto the rim of a bucket (e.g., bucket 210) and to be securely fastened to a rim of the bucket (e.g., using a screw or ratchet mechanism). The thru-slot 367 is an oblong, vertical thru-hole passing through a central, horizontal axis of the strut 355. The support arms 359 comprise rigid plates securely affixed to an upper surface of the strut 355. The support arms 359 can extend at an angle in an upward direction from the upper surface of the strut 355. The support arms 359 may face each other and be at an inclined angle relative to the bucket strut 355.

To mount the flocculation system 300 to a bucket, a user attaches the bucket mount 350 to the bucket by attaching (e.g., clamping) it to the rim of the bucket using the mounting flanges 363. Next, the user can insert the bottom portion 317 of the flocculation system 300, which includes the floc filter 321, into the thru-slot 367 of the bucket mount 350 such that the floc filter 321 hangs below the bucket mount 350. The user can then attach the flocculation system 300 to the bucket mount 350 by hanging the lip 315 over the support arms 359, thereby suspending the flocculation system 300.

To use the flocculation system 300, the user can wring out dirty water from a mop (e.g., mop 173) or other cleaning tool on the plates 333 of the wringer 329. Water, dirt, and debris wrung from the mop can flow over the sidewall 309, through the thru-slot 367, and into the floc filter 321. As the water flows, the flocculant (e.g., flocculant 115) provided on the sidewall of the flocculation device 300 causes the dirt in the water to form flocs. The flocs and debris are filtered and trapped by the floc filter 321, while clarified water passes through the floc filter 321 and into the bucket. After use, the user can remove the flocculation system 300 from the bucket mount 350 and dispose of it. The clarified water in the bucket and any cleaning product contained therein can be reused.

Figure 4A:
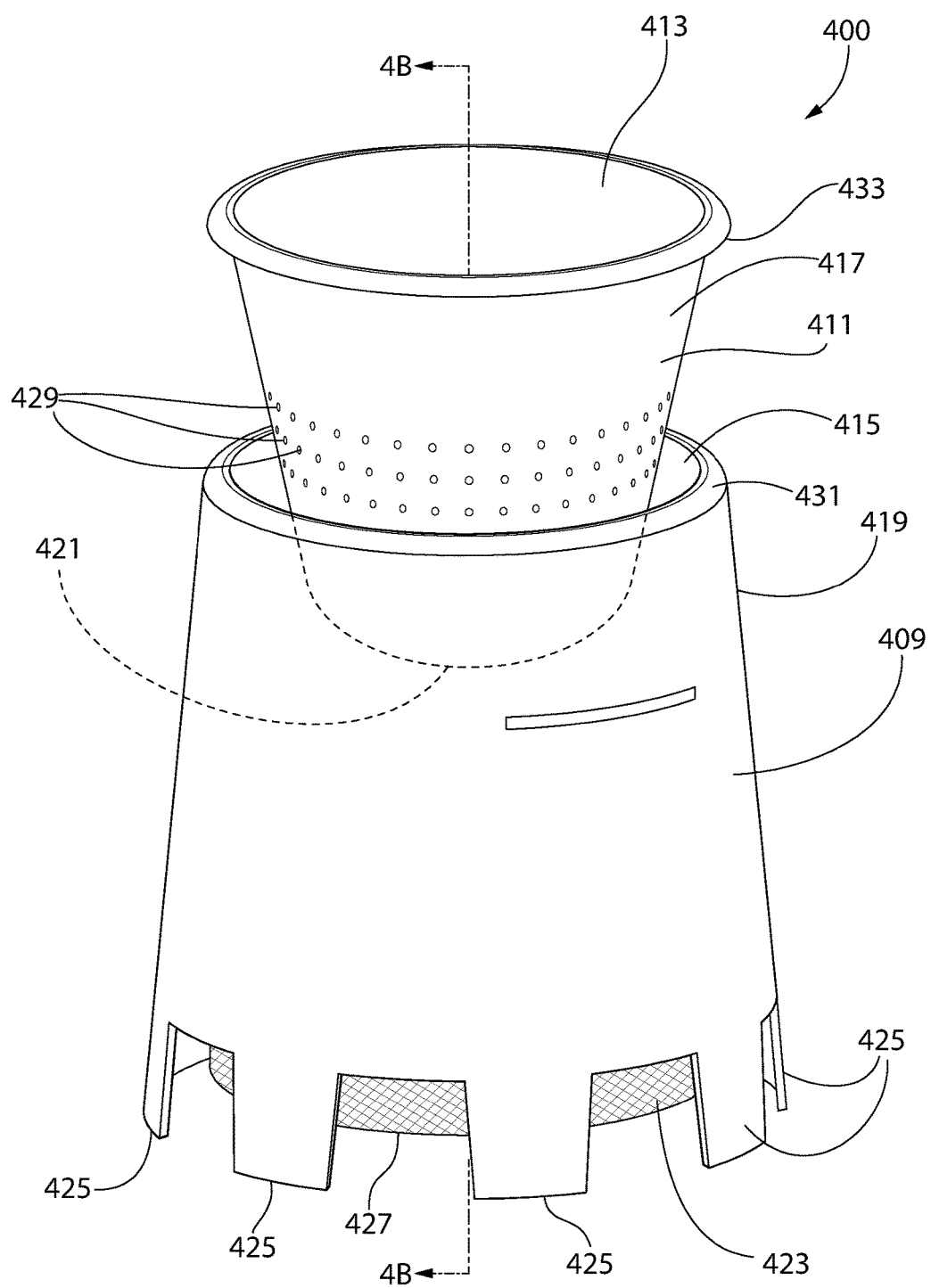
FIG. 4A illustrates a side perspective view of an exemplary flocculation system in accordance with aspects of the present disclosure.

FIG. 4A illustrates a side perspective view of an exemplary flocculation system 400 in accordance with aspects of the present disclosure. The flocculation system 400 includes a base 409 and a wringer 411. In implementations, the base 409 has a substantially cylindrical form including an open top 415, a sidewall 419, and a closed bottom 423. Additionally, the base 409 can include one or more feet 425. The sidewall 419 can be a rigid or semi-ridged, water-impermeable material, such as metal, plastic or PVC (polyvinyl chloride). The closed bottom 423 can include a floc filter 427 that traps flocs and other debris, while passing water. In embodiments, the floc filter 427 is a mesh screen or perforated surface having holes, where the holes may be less than about one-quarter inch across for square holes, or in diameter for round holes. In some implementations, the holes may be less than about one-eighth inches across.

The wringer 411 can have a substantially cylindrical or conical form, an open top 413, a sidewall 417, and a closed bottom 421, with the sidewall 417 and the closed bottom 421 having a large number of thru-holes 429. For example, the wringer 411 can have the form or shape of an inverted cone or an inverted truncated cone or frustum. In embodiments, the open top 413 of the wringer 411 has a shape and circumference that is similar to that of the open top 415 of the base 409 such that it interconnects with the top edge 431 of the base 409, and the bottom 421 of wringer 411 hangs within the interior of the base 409. In some configurations, the top 413 has an outer lip 433 configured to mate with the top edge 431 of the base 409. In some other configurations the outer lip 433 flares outward substantially beyond the circumference of the top edge of the base 409, which prevents the wringer 411 from passing through the open top 415 of the base 409.

Figure 4B:
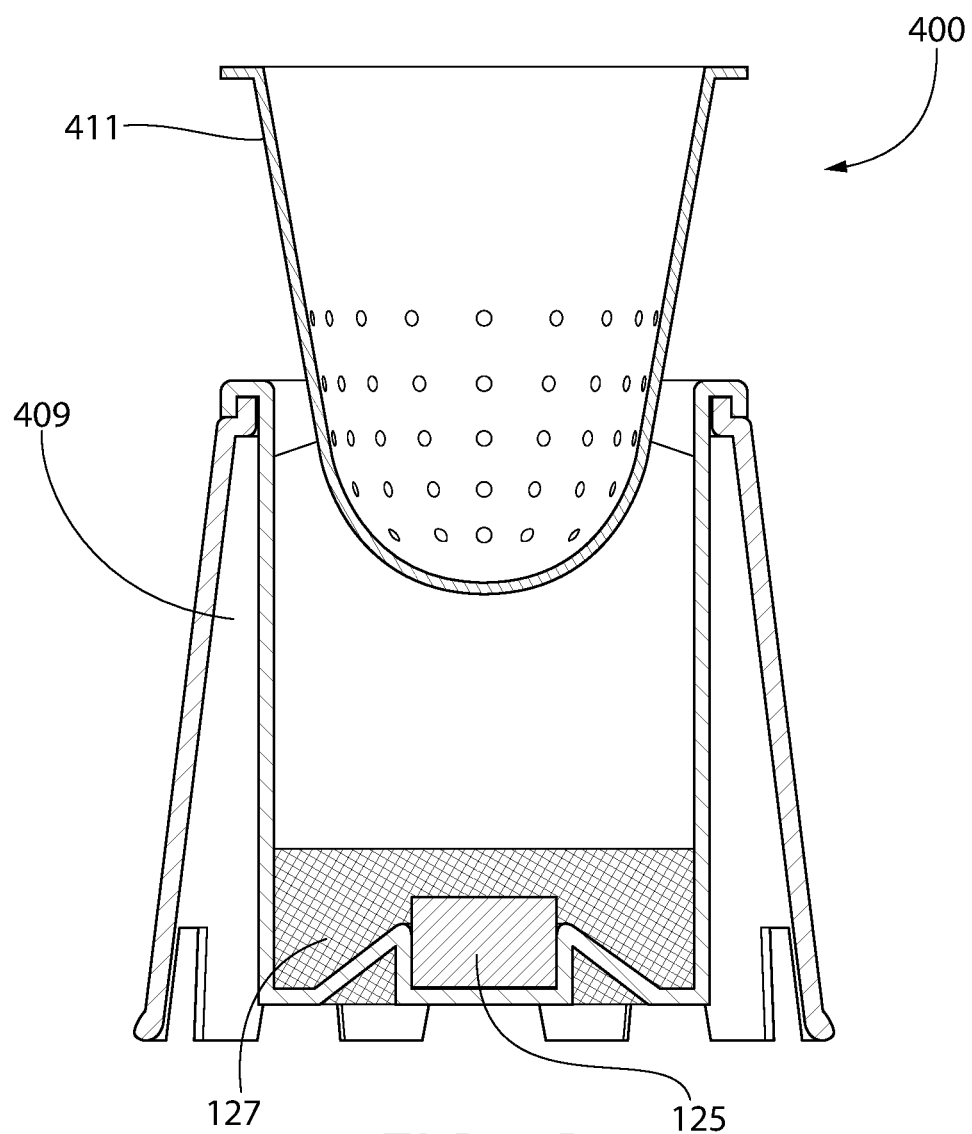
FIG. 4B illustrates a cutaway, side view of an exemplary flocculation system in accordance with aspects of the present disclosure.

FIG. 4B illustrates a cutaway, exploded side view of the exemplary flocculation system 400, including the base 409, the wringer 411, and the floc filter 427. In some implementations, the wringer 411 is coated or embedded with a flocculation product (e.g., flocculation product 115) as previously described herein. Additionally or alternatively, the base 409 can include a flocculant dispenser 125, which can be the same or similar to that previously described herein.

Figure 4C:
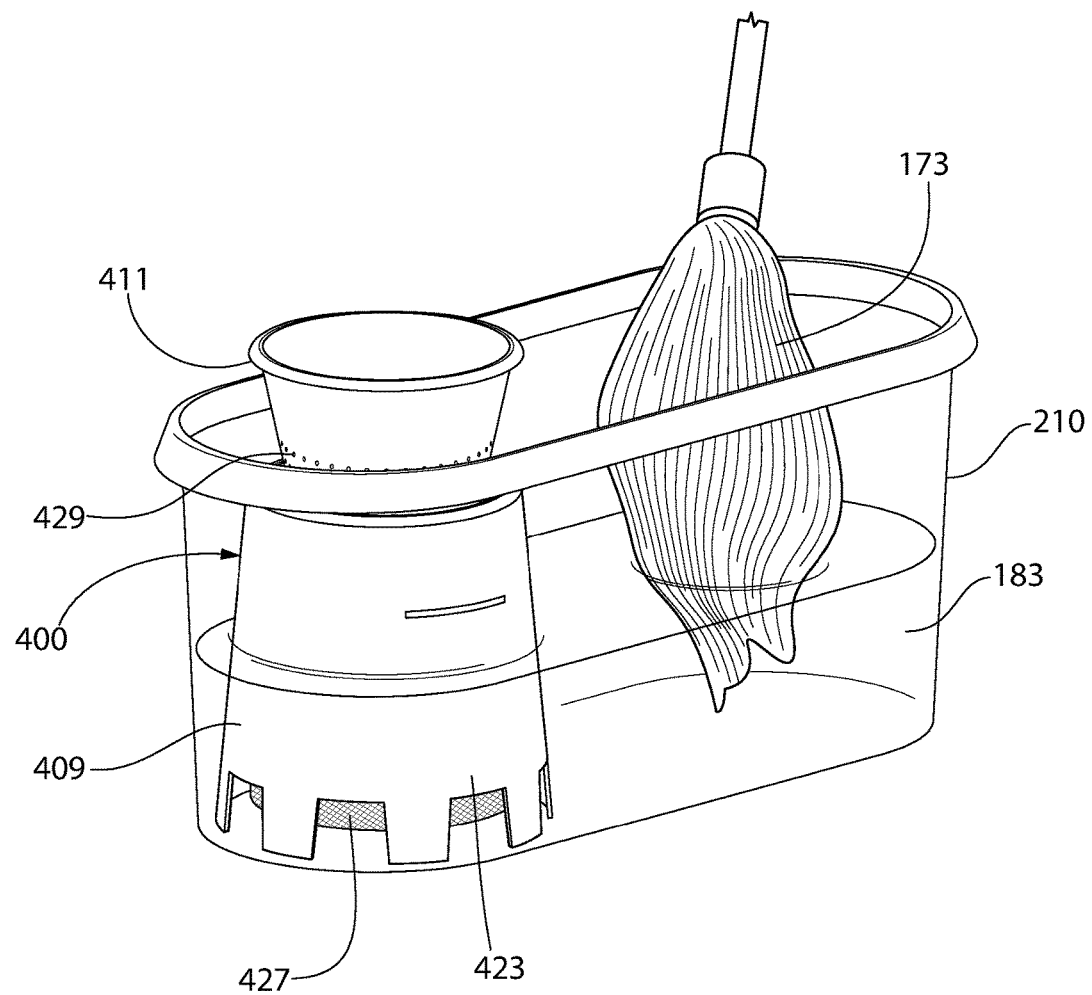
FIG. 4C illustrates side perspective view of a flocculation system in an exemplary use in accordance with aspects of the present disclosure.

FIG. 4C illustrates a side perspective view of the flocculation system 400 in an exemplary use situation. The flocculation system 400 can be partially submerged in a bucket 210 containing water. A user can then clean dirt and debris from a mop 173 by pressing it into the wringer 411. Pressure from the user forces water, dirt, and debris out of the mop 173 and into the base 409 via the holes 429 in the wringer 411. Floccuent distributed in the water (e.g., flocculant 115 or 127) causes the dirt to flocculate and, along with other debris, settle toward the bottom 423 of the base 409. The flocs and debris then become trapped inside the base 409 by the floc filter 427, which allows clarified water 183 (e.g., the water from the mop after the flocs and other debris are filtered out) to flow out of the flocculation system 400 into the bucket 210. As the flocs or debris are trapped by the floc filter 427, a user can rinse the mop 173 using the clarified water 183 from the bucket 210 (as shown in FIG. 4B)

without the mop 173 becoming fouled. After the user completes the cleaning job with the flocculation system 400, the clarified water 183 in the bucket 210 and any cleaning product contained therein can be reused for a next cleaning job. Additionally, the user can clean the flocculation filter 427 of dirt of debris and reuse it for the next cleaning job. Further, the user can replace or refill the flocculant dispenser 125 to provide fresh flocculant product for the next cleaning job.

Figure 5A:
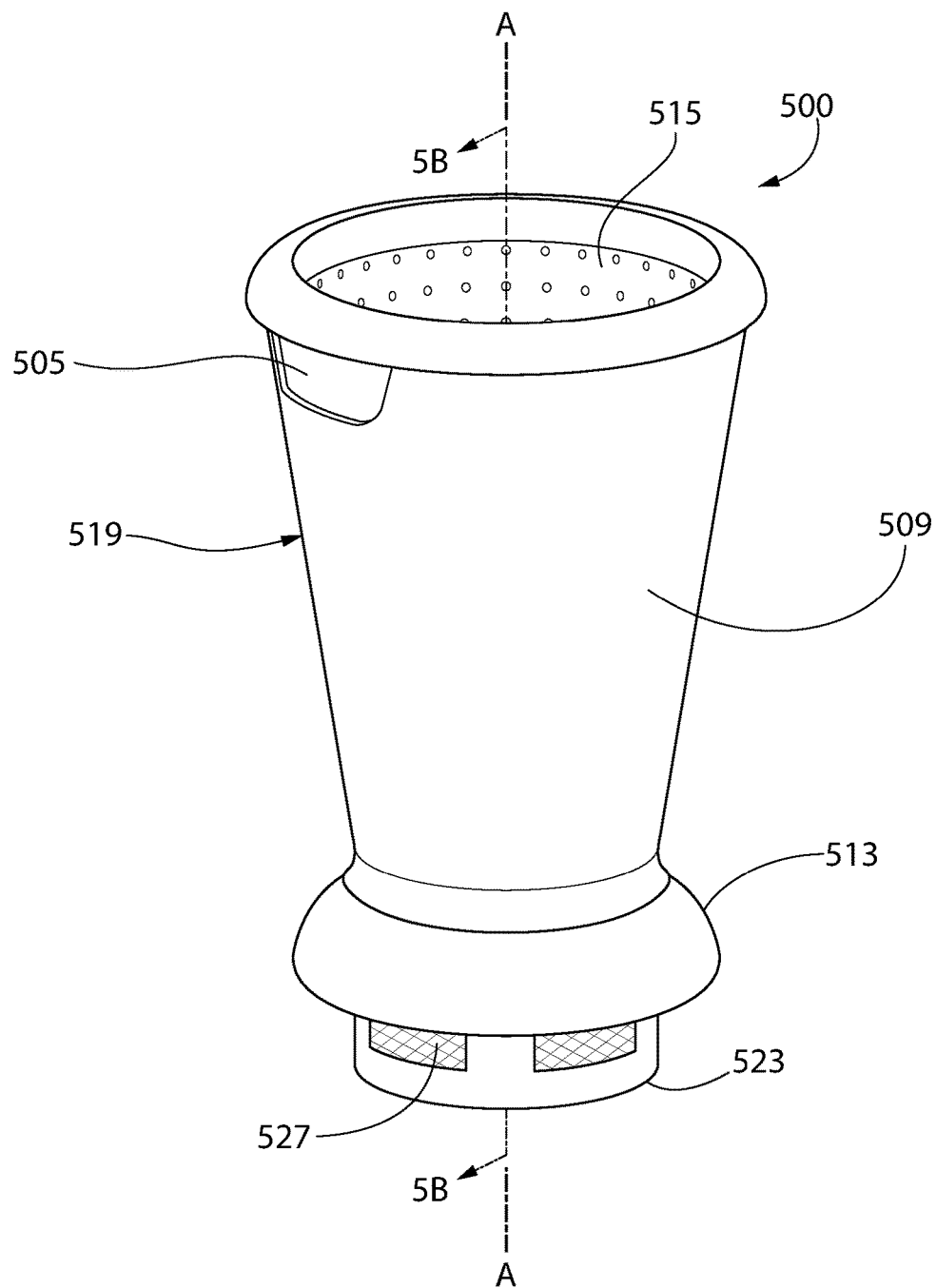
FIG. 5A illustrates a side perspective view an exemplary flocculation system in accordance with aspects of the present disclosure.

FIG. 5A illustrates a side perspective view of a flocculation system 500 in accordance with aspects of the present disclosure. The flocculation system 500 includes a wringer 505 and a base 509. The wringer 505 can be similar to that previously described herein (e.g., wringer 311 or 411). The base 509 can include an open top 515, a sidewall 519, and a bottom 523 having a floc filter 527, which can also be similar those previously described herein (as in, e.g., base 409). Additionally, the base 509 includes a one-way pump 513 that forces the liquid out of the base 509 through the floc filter 527. In implementations, the one-way pump 513 includes an elastic element configured to compress under a downward vertical force along the central vertical axis A of the flocculation system 500 (e.g., plunging of a mop into the wringer 500). The elastic element of the one-way pump 513 can be, for example, an elastic bladder or a bellows spring.

Figure 5C:
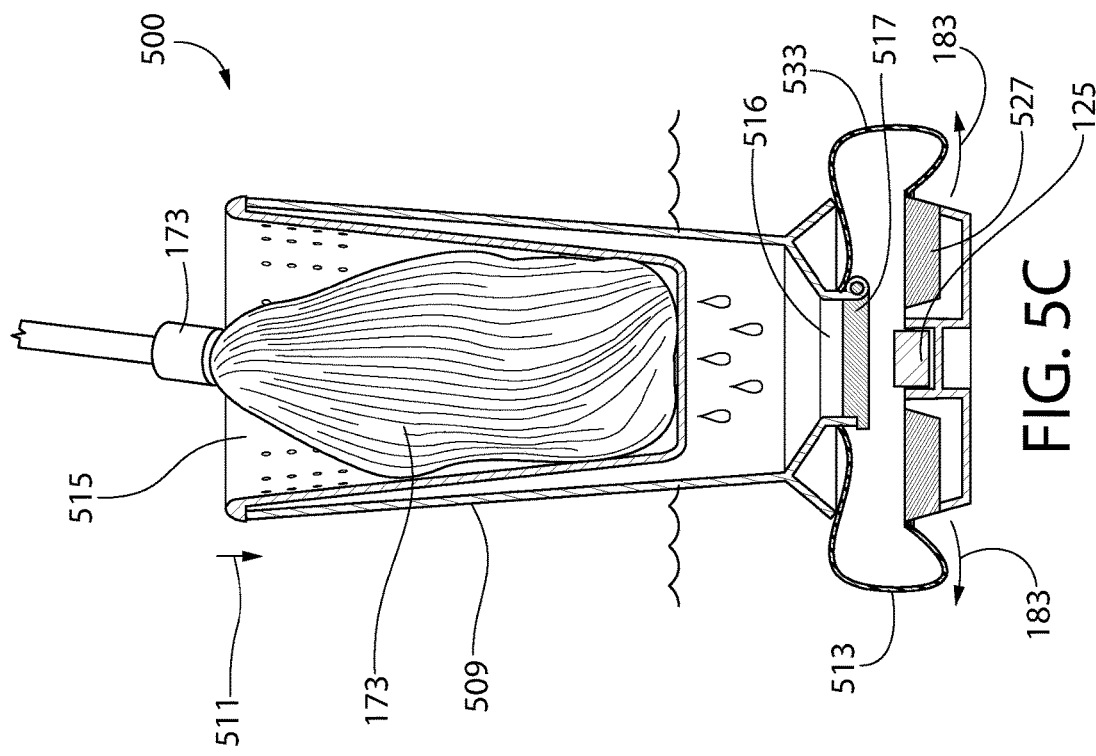
FIG. 5C illustrates a cutaway side view of an exemplary flocculation system in accordance with aspects of the present disclosure.
Figure 5B:
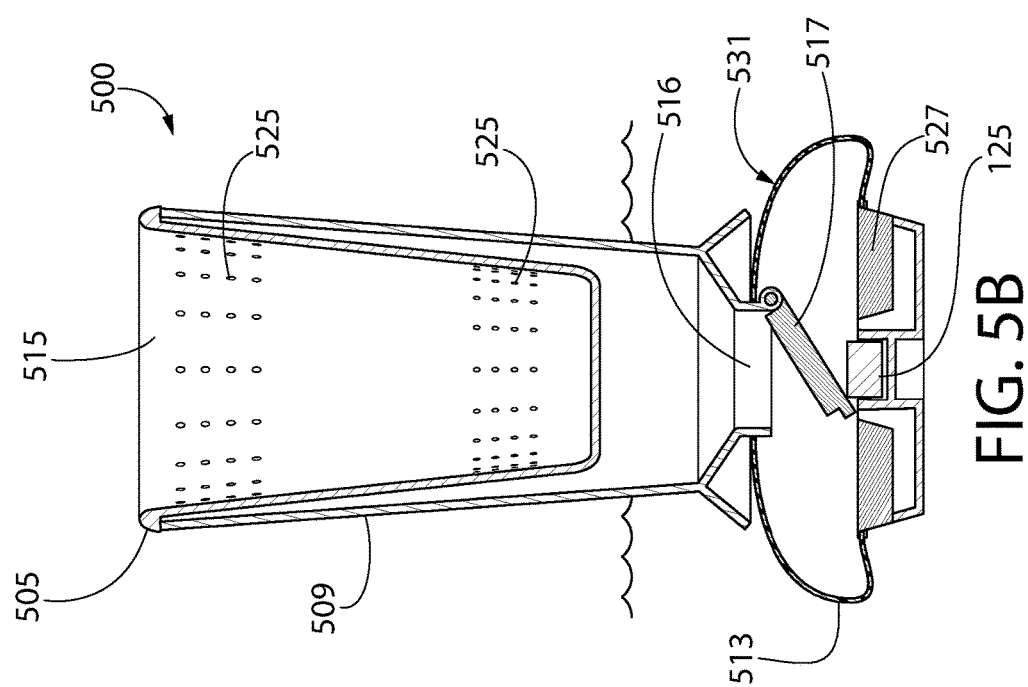
FIG. 5B illustrates a cutaway side view of an exemplary flocculation system in accordance with aspects of the present disclosure.

FIGS. 5B and 5C illustrate cutaway side perspective views of the exemplary flocculation system 500. As described above, the flocculation system 500 includes the wringer 505, the base 509, the one-way pump device 513, and the flocculation filter 527. Additionally, the flocculation system can include a flocculant dispenser 125, which can be the same or similar to that previously described herein. Further, the one-way pump 513 includes a thru-hole 516 and a flapper valve 517, wherein the flapper valve 517 is configured to plug the thru-hole 516 when the one-way pump 513 is actuated. More specifically, the flapper valve 515 is configured to remain open when elastic element of the one-way pump 513 is in its normal, expanded form 531 (FIG. 5B), and to close when the one-way pump 513 is in an actuated, compressed form 533 (FIG. 5C).

In use, the flocculation system 500 may be submerged in a bucket (e.g., bucket 210) of water, as previously described herein. A user can remove water, dirt, and debris from the mop 173 by plunging it into the wringer 505. Downward vertical force 511 from the plunging action forces the water, dirt, and debris, out of the mop 173 and into the base 509 via the holes 525 in the wringer 505. As the water flows, flocculant (e.g., flocculant 115) provided on the sidewall of the wringer 505 and/or from the flocculant dispenser 125 causes the dirt in the water from the mop 173 to form into flocs. The force 511 also actuates the one-way pump 513, which causes the one-way pump 513 to compress from the expanded form 531 shown in FIG. 5B, to the compressed form 533 shown in FIG. 5C. Such actuation causes the wringer 505 and the base 509 to vertically translate downward from a first position shown in FIG. 5B to a second vertical position shown in FIG. 5C. In turn, the translation causes the flapper valve 517 to close due to increased water pressure, and the closed flapper valve 517 prevents the backflow of water, flocs, and debris out of the one-way pump 513 and into the upper section of the base 509. Rather, the actuation of the one-way pump 513 forces the flocs, debris, and water that is inside the one-way pump 513 into the floc filter 527, where the water flows through the floc filter 527, and out of the base 509. The flocs and the debris are thereby trapped inside the base 509 by the floc filter 527, while allowing clarified water 183 to pass into the bucket.

After the user completes the cleaning job with the flocculation system 500, the clarified water and any cleaning product contained therein can be reused for a next cleaning job. Additionally, the user can clean the flocculation filter 527 and replenish the flocculant for the next cleaning job.

Figure 6A:
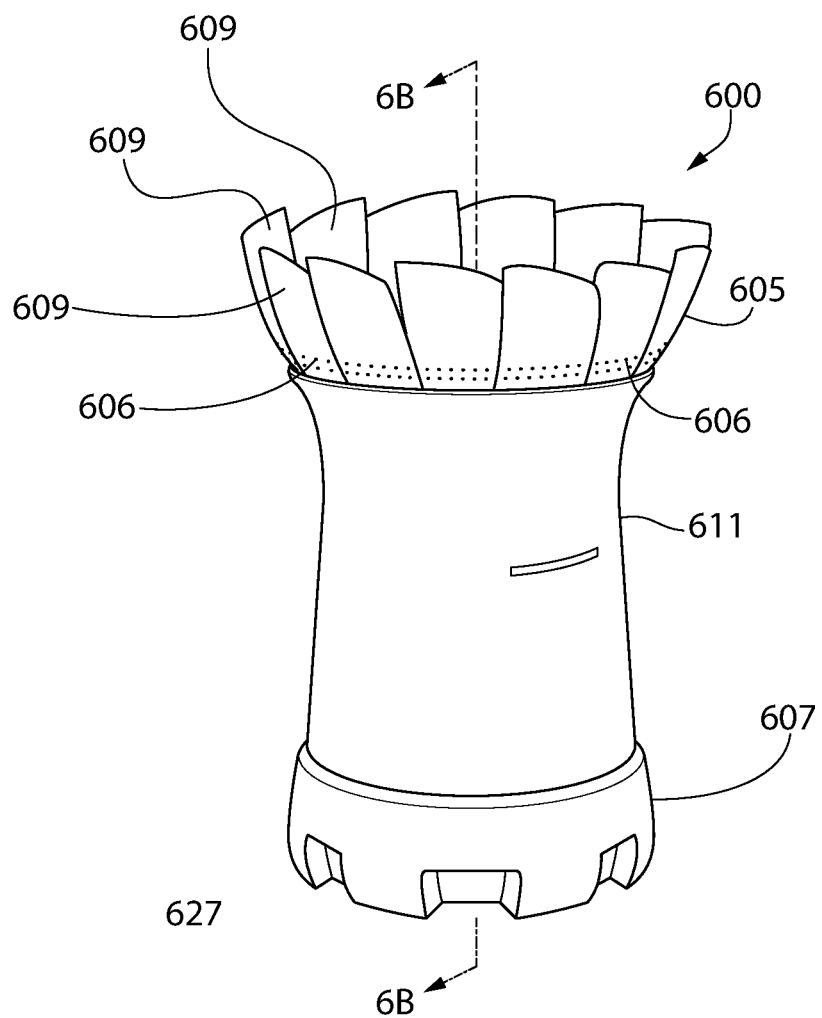
FIG. 6A illustrates a side perspective view of an exemplary flocculation system in accordance with aspects of the present disclosure.

FIG. 6A illustrates a side perspective view an exemplary flocculation system 600 in accordance with aspects of the present disclosure. Flocculation system 600 includes a wringer 605 and a base 607. The wringer 605 comprises a perforated vessel with a large number of thru holes 606 to allow water, dirt, and debris to pass into the base 607 in the same or similar manner to that previously described herein. In implementations, the wringer 605 includes a number of individually hinged, interleaved leaves 609, which may be made of a rigid material (e.g., metal or rigid plastic), and that can pivot from an open position to a compressed position. For example, the leaves 609 may pivot inward in response to a downward vertical force applied to the wringer 605 by a mop (e.g., mop 173) or other cleaning tool, and as they move, the leaves 609 compress the mop, which wrings out the mop and scrapes off debris.

Figure 6B:
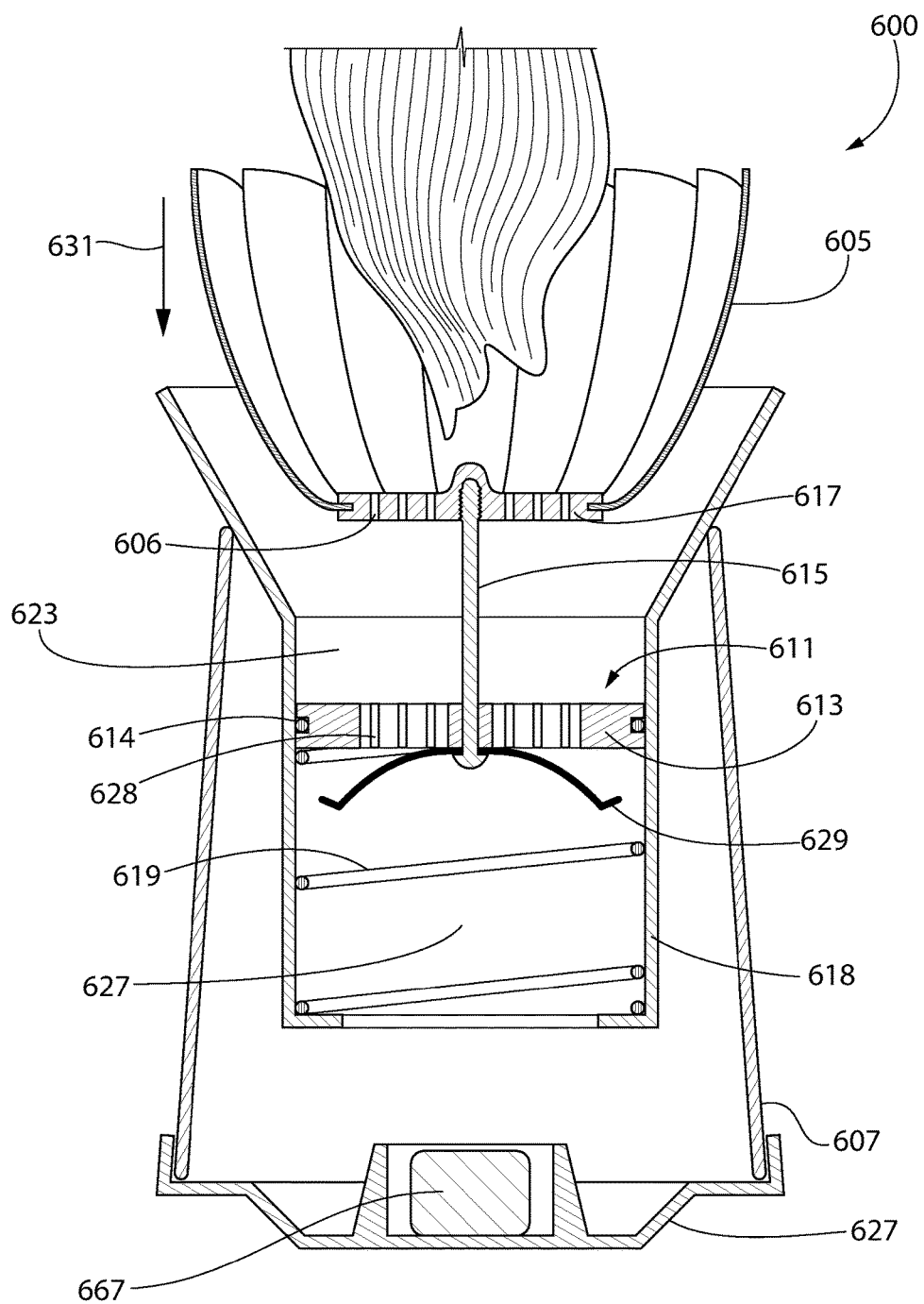
FIG. 6B illustrates a cutaway side view of an exemplary flocculation system in accordance with aspects of the present disclosure.

FIG. 6B illustrates cutaway side perspective view of the flocculation system 600 showing interior elements of the base 607, including a floc filter 627, a pump device 611, and a flocculant dispenser 667. The floc filter 627 can be the same or similar to those previously described herein (e.g., floc filters 427 and/or 527). The pump device 611 includes a press filter 613, a rigid, linear connector 615, a press plate 617, an interior sidewall 618, and a spring 619.

The filter plate 613 includes a plate perforated with thru-holes 628 ranging in size from about one-quarter inch to about one inch across. The filter plate 623 abuts and closes the interior sidewall 618 of the pump device 611 such that it defines an upper interior space 623 above the upper surface of the filter plate 613. Further, the filter plate 613 defines a lower interior space 627 within the interior sidewall 618 below a bottom surface of the filter plate 613. In configurations, the filter plate 613 includes a seal 614 (e.g., a gasket) around its outer edge that forms a substantially water-tight seal between the filter plate 613 and the interior sidewall 618. The thru-holes 628 of the filter plate 613 pass the water, flocs, and debris from the upper interior space 623 to the lower interior space 625, while a second seal 629 prevents backflow into the upper interior space 623 when the pump device 611 is forced downward though the lower interior space 627. For example, the seal 629 can be a normally-open diaphragm or flapper valve.

The press plate 617 includes a large number of thru-holes 606 configured to pass the water, dirt, and debris into the upper interior space 623. The thru-holes 606 can also range in size from about one-quarter inch to about one inch across. In some configurations, the press plate 617 can be affixed to a bottom of the wringer 605. In other configurations, the press plate 617 can comprise the bottom of the wringer 605. A first end of the linear connector 615 is connected to the press plate 617, and a second end of the linear connector 615 is connected to a press filter 613. Accordingly, downward vertical force 631 applied to press plate 617 via the wringer 605 drives the wringer 605, the press filter 613, and the press plate 617 downward toward the floc filter 627 through the lower interior space 627. The spring 619 provides an upward force that returns the wringer 605, the press filter 613, and the press plate 617 to their original positions when the downward force 631 is removed.

Figure 6C:
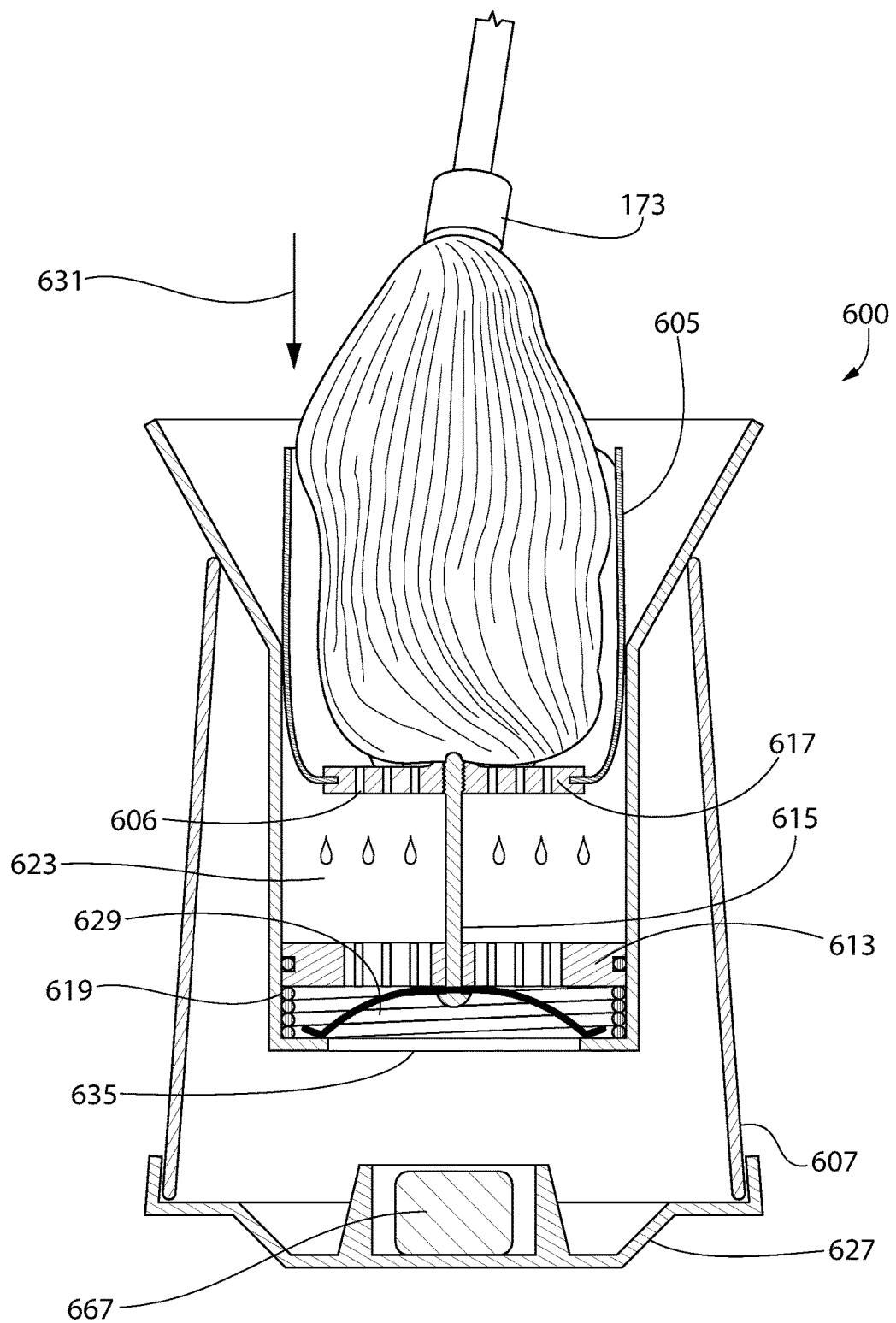
FIG. 6C illustrates a cutaway side view of an exemplary flocculation system in accordance with aspects of the present disclosure.

FIG. 6C illustrates cutaway, side perspective view of the flocculation system 600 in an exemplary use situation. Using the flocculation system 600, a user can wring water, dirt, and debris from the mop 173 by pressing it into the press plate 617 and the wringer 605. Downward vertical force 631 from the user forces water, dirt, and debris out of the mop 173 and into the upper interior space 623 below the wringer 605. The dirt and debris is thereby exposed to flocculant from the flocculant dispenser 667, which causes the formation of flocs that settle through the press filter 613 into the lower interior space 627. Additionally, the downward force 621 from the user on the press plate 617 linearly drives the press filter 613 (through the lower interior space 627) which forces water, flocs, and debris to the bottom of the base 607. The downward force 631 on the filter plate 613 compresses the spring 619 and closes the seal 629 over an opening 635 in the bottom of the interior sidewall 618, which prevents backflow from the base 607. The flocs and debris are thereby trapped inside the base 607 by the floc filter 627, which allows clarified water to pass out of the base 607 and into a bucket, as described previously herein. When the downward force 631 is removed from the pressure plate, the spring 619 returns the press filter 613 and press plate 617 to its original position.

Figure 7A:
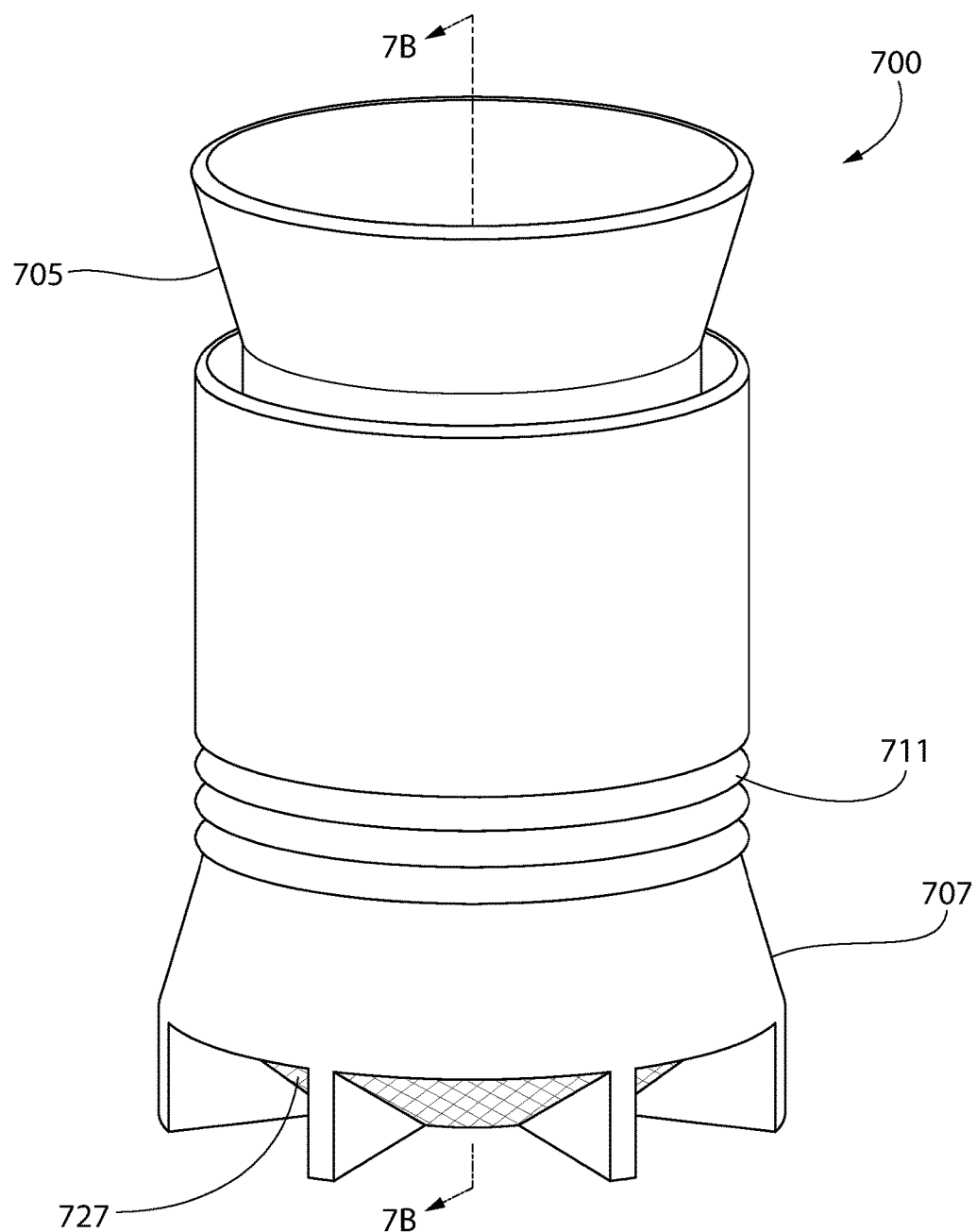
FIG. 7A illustrates a side perspective view of an exemplary flocculation system in accordance with aspects of the present disclosure.

FIG. 7A illustrates a perspective view an exemplary flocculation system 700 in accordance with aspects of the present disclosure. Flocculation system 700 includes a wringer 705, a base 707, a pump device 711, and a floc filter 727. In a manner similar to that previously described herein, the wringer 705 drives the pump device 711 that forces water out of the base 707 through the floc filter 727. FIGS. 7B and 7C illustrate cutaway side views of the flocculation system 700. The wringer 705 can have a substantially cylindrical and/or conical form having an open top 712, a sidewall 715, and a bottom 719 having thru-holes 725 sized to pass dirt and debris, which may be the same or similar to those previously described herein. The base 707 can have a substantially cylindrical form having an open top 731, a sidewall 735, a first bottom 737, and a second bottom 739. The second bottom 739 includes a thru-hole 743 along the vertical axis A. The pump device 711 includes a bellows spring 745, a rigid conduit 747, a plug 749, and a flocculant dispenser 751. The sidewall 735 of the base 707 abuts and/or mates with the sidewall 715 of the wringer 705 in a water-tight fashion such that water does not escape from the top 731 when the pump device 711 is actuated. The conduit 747 connects the wringer 705 and the plug 749 such that these elements move downward together in a vertical direction against the upward force of the bellows spring 745. The flocculant dispenser 751 may include a flocculant that is the same or similar to those previously described herein. In implementations, the flocculant dispenser 751 has an annular shape, wherein the inner diameter is greater than the diameter of the plug 749.

The bottom of the wringer 705, the sidewall 735 of the pump device 711, the second bottom 739, and the plug 749 define an upper interior space 765 of the pump device 711 that can contain water when the flocculation system 700 is submerged. As illustrated in FIG. 7B, the plug 749 plugs the thru-hole 743 in the second bottom 739 such that, when the pump device 711 is in its uncompressed position, water in the interior space is prevented from entering the thru-hole 743. However, as illustrated in FIG. 7C, when the pump device 707 is actuated by a downward manual force 761 from a user (e.g., by pressing a mop 173 into the wringer 705), the wringer 705, the rigid conduit 747, and the plug 749 are driven downward. More specifically, the pump device 707 may compress from its original position, as shown in FIG. 7B, to a second position, as shown in FIG. 7C. As a result, the thru-hole 743 is unplugged and water from the upper interior space 765 is forced through a lower interior space 767 below the thru-hole 743, and out the floc filter 727 under pressure from the bottom 719 of the wringer 705. This water is clarified as it moves through the floc filter 727 from the flocculation system 700 into the bucket, as the floc filter 727 traps flocs and other debris from the water, as previously described herein. When pressure is removed from the wringer 705, the bellows spring 745 drives the wringer 705 to back to its original position, which also causes the plug 749 to plug the thru hole 743. Accordingly, the flocculation system 700 provides clarified water substantially free of dirt, debris, and flocs, which remain trapped in the floc filter 727.

The above features have been described in detail with particular reference to certain preferred embodiments thereof, but it will be understood that variations and modifications can be effected within the spirit and scope of the disclosure. One of skill in the art will appreciate that each of the above are exemplary implementations and are not to be construed as a limitation on the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in any ensuing claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A flocculation system, comprising: a vessel comprising:
   an open top;
   a sidewall comprising a water-impermeable material;
   a cavity open to said open top and bounded by said sidewall;
   a first bottom comprising the water-impermeable material;
   a second bottom comprising a floc filter configured to pass flocs and prevent the passage of a cleaning tool;
   a floc trap below the second bottom, the floc trap comprising a space defined by the sidewall, the first bottom, and the floc filter; and
   a flocculant, wherein the flocculant is pre-disposed on one or more of the floc filter-and the second bottom so that the flocculant releases when exposed to or submerged in water, and the sidewall and the first bottom is pre-coated with or pre-impregnated with the flocculant so that the flocculant releases when exposed to or submerged in water.

2. The flocculation system of claim 1, wherein the flocculant is a solid or a gel.

3. The flocculation system of claim 1, wherein the floc filter comprises a replaceable dispenser storing the flocculant.

4. The flocculation system of claim 3, wherein the dispenser is positioned over the first bottom.

5. The flocculation system of claim 3, wherein the dispenser is positioned over the second bottom.

6. The flocculation system of claim 1, wherein the floc filter comprises a mesh screen.

7. The flocculation system of claim 6, wherein the mesh screen comprises a plurality of holes, and wherein the holes range in size from about 6.35 mm. to about 25.4 mm. across.

8. The flocculation system of claim 1, wherein the vessel is configured to collapse to a flat form.

9. The flocculation system of claim 8, wherein the sidewall is configured to accordion to the flat form using a plurality of folding edges in the sidewall.

10. The flocculation system of claim 9, wherein the first bottom and the second bottom are configured to collapse to the flat form using at least one horizontal folding edge in the sidewall.

11. The flocculation system of claim 1, wherein the flocculation system is self-standing when filled with a liquid.

12. The flocculation system of claim 1, wherein the flocculation system comprises a disposable bucket insert.

\* \* \* \* \*